(12) United States Patent
Pinhasov

(10) Patent No.: US 9,833,093 B2
(45) Date of Patent: Dec. 5, 2017

(54) DRINKING CONSUMPTION INSPECTION APPARATUS AND METHOD

(71) Applicant: Shay Pinhasov, Petach Tikva (IL)

(72) Inventor: Shay Pinhasov, Petach Tikva (IL)

( * ) Notice: Subject to any disclaimer, the term of this patent is extended or adjusted under 35 U.S.C. 154(b) by 0 days.

(21) Appl. No.: 15/268,590

(22) Filed: Sep. 18, 2016

(65) Prior Publication Data

US 2017/0112314 A1    Apr. 27, 2017

(30) Foreign Application Priority Data

Oct. 21, 2015 (IL) .......................................... 242196

(51) Int. Cl.
| | | |
|---|---|---|
| *G08B 21/00* | (2006.01) | |
| *A47G 23/10* | (2006.01) | |
| *G01G 19/52* | (2006.01) | |
| *G08B 21/18* | (2006.01) | |
| *G08B 5/22* | (2006.01) | |

(52) U.S. Cl.
CPC ............. *A47G 23/10* (2013.01); *G01G 19/52* (2013.01); *G08B 21/182* (2013.01); *G08B 5/22* (2013.01)

(58) Field of Classification Search
CPC ..................................................... A47G 23/10
See application file for complete search history.

(56) References Cited

U.S. PATENT DOCUMENTS

| | | | | |
|---|---|---|---|---|
| 2008/0093357 A1* | 4/2008 | Norman | ................. | B65D 81/34 219/521 |
| 2013/0029298 A1* | 1/2013 | Batsikouras | ....... | G01G 19/4146 434/127 |
| 2016/0015602 A1* | 1/2016 | Panzini | ................. | A61J 7/0481 340/666 |
| 2016/0166096 A1* | 6/2016 | DiMaria-Ghalili | .... | G06Q 50/24 702/19 |

FOREIGN PATENT DOCUMENTS

WO         2015017702         5/2015

\* cited by examiner

*Primary Examiner* — Thomas McCormack
(74) *Attorney, Agent, or Firm* — Daniel J. Swirsky; AlphaPatent Associates Ltd.

(57) ABSTRACT

A drinking consumption inspection apparatus, including: a plurality of compartments; a plurality of cups, each being associated to a different and only to one person, and to a different and only one of the compartments, for inserting the cup thereinto; a weight for each of the compartments, for weighing the cup thereof, upon the insertion; and a controller, for accumulating decrease of sequential weights provided by said weights, for each cup separately, over time, thereby the drinking consumption inspection apparatus records drinking quantity of each of the cups, for inspecting that each person drinks sufficiently.

5 Claims, 5 Drawing Sheets

DRINKING CONSUMPTION INSPECTION APPARATUS AND METHOD

CROSS-REFERENCE TO RELATED APPLICATIONS

This application claims the benefit of priority from Israel Patent Application No. 242196, filed Oct. 21, 2015, the disclosure of which is incorporated herein by reference.

TECHNICAL FIELD

The invention relates to the field of drinking. More particularly, the invention relates to a method and apparatus for inspecting sufficient drinking of each person of a group.

BACKGROUND

WO2015/017702 discloses a tool for inspecting that a single user drinks enough.

However, inspection that each person in a group, such as in kindergarten, in the hospital, in sport facilities, etc., drinks enough is applied by human inspection.

SUMMARY

There is a long felt need to accompany group inspection by technological means.

The invention provides a solution to the above-mentioned and other problems of the prior art.

In one aspect, the invention is directed to a drinking consumption inspection apparatus, including:
- a plurality of compartments;
- a plurality of cups, each being associated to a different and only to one person, and to a different and only one of the compartments, for inserting the cup thereinto;
- a weight for each of the compartments, for weighing the cup thereof, upon the insertion; and
- a controller, for accumulating decrease of sequential weights provided by said weights, for each cup separately, over time, thereby the drinking consumption inspection apparatus records drinking quantity of each of the cups, for inspecting that each person drinks sufficiently.

BRIEF DESCRIPTION OF THE DRAWINGS

Embodiments, features, and aspects of the invention are described herein in conjunction with the following drawings.

The drawings are not necessarily drawn to scale.

DETAILED DESCRIPTION

The invention will be understood from the following detailed description of embodiments of the invention, which are meant to be descriptive and not limiting. For the sake of brevity, some well-known features, methods, systems, procedures, components, circuits, and so on, are not described in detail.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

Figure 1:
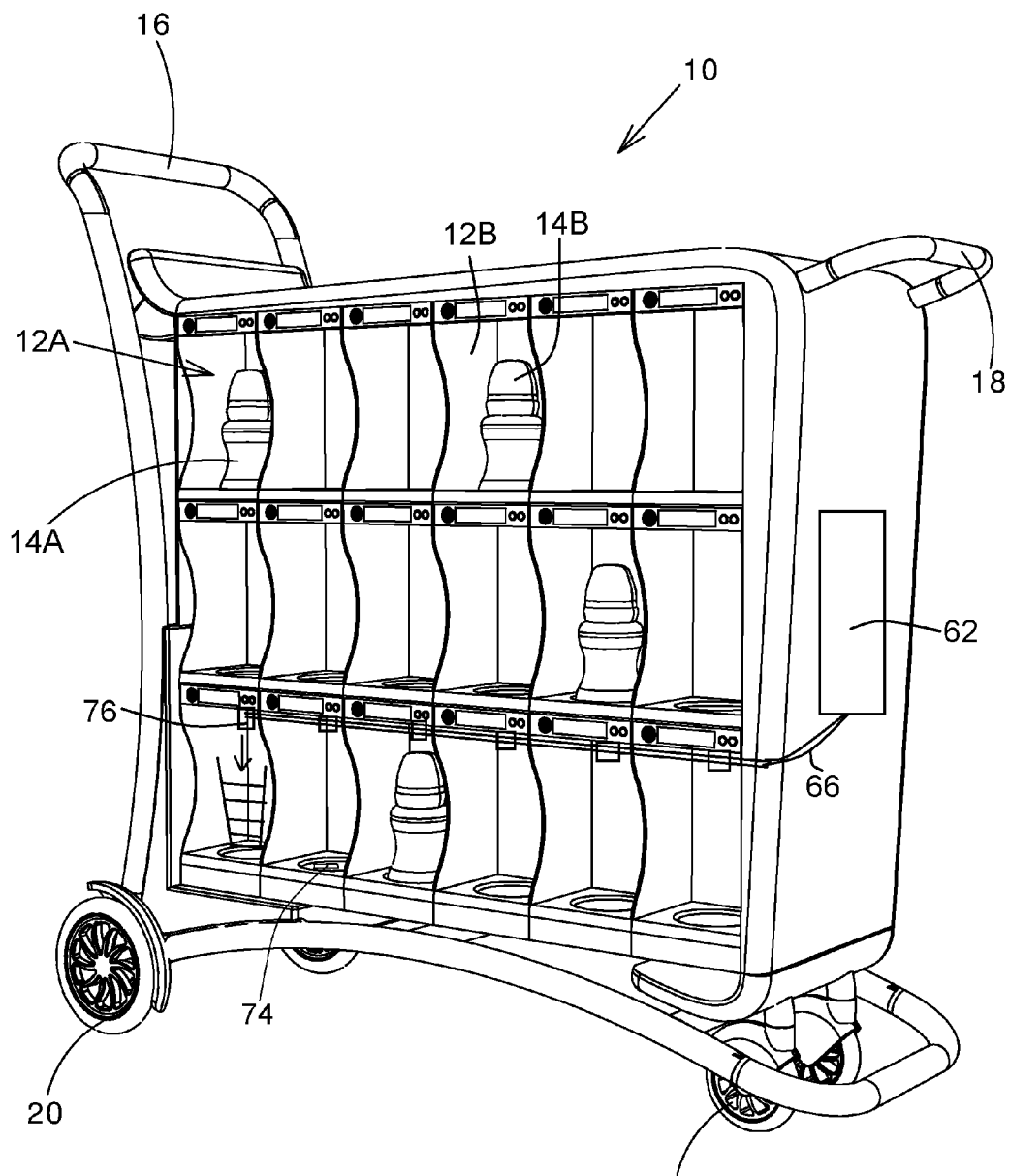
FIG. 1 depicts a drinking consumption inspection apparatus according to one embodiment.

FIG. 1 depicts a drinking consumption inspection apparatus according to one embodiment.

A drinking consumption inspection apparatus 10 includes a plurality of compartments, namely 12A, 12B, etc., each for housing a drinking cup, associated thereto. The compartments form together a cart having wheels 20 and 22.

Thus, drinking consumption inspection apparatus 10 allow drinking cup 14A to be housed by compartment 12A only, drinking cup 14B to be housed by compartment 12B, etc.

Figure 2:
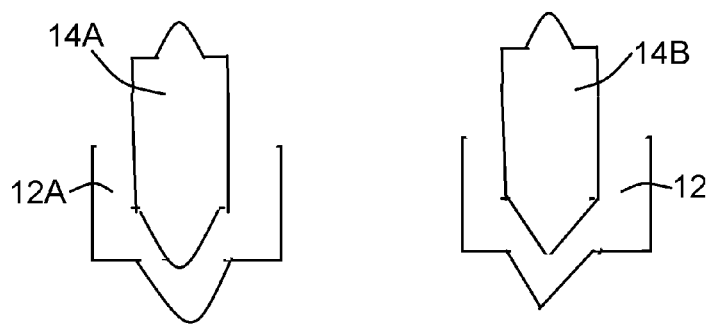
FIG. 2 depicts the difference between the cups and compartments.

FIG. 2 depicts the difference between the cups and compartments.

The association may be mechanical, such as that the cups and the compartments have complementary shapes. For example, the bottom of cup 14A and the bottom of compartment 12A are round, whereas the bottom of cup 14B and the bottom of compartment 12B are triangle.

Figure 3:
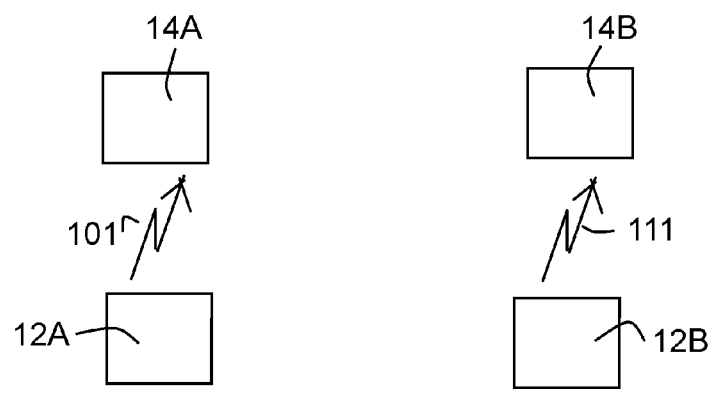
FIG. 3 depicts the difference between the cups and compartments, according to another embodiment.

FIG. 3 depicts the difference between the cups and compartments, according to another embodiment.

According to another embodiment, the association may be electronic, such as that there is a communication of codes therebetween. Thus drinking consumption inspection apparatus 10 does not allow insertion of cup 12A into compartment 14B.

Figure 4:
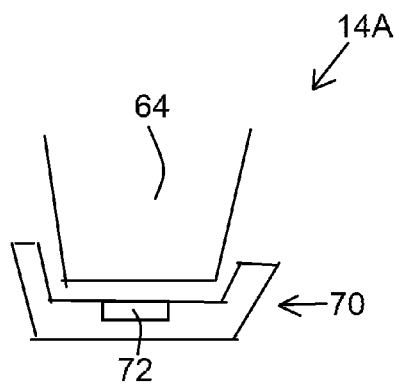
FIG. 4 depicts the elements of each cup.

FIG. 4 depicts elements of each cup.

Each of cups 14A and 14B may include a standard cup unit 64, being attached to a base 70, which may provide the different shape and electronic characteristic, such as by an electronic circuit 72.

Figure 5:
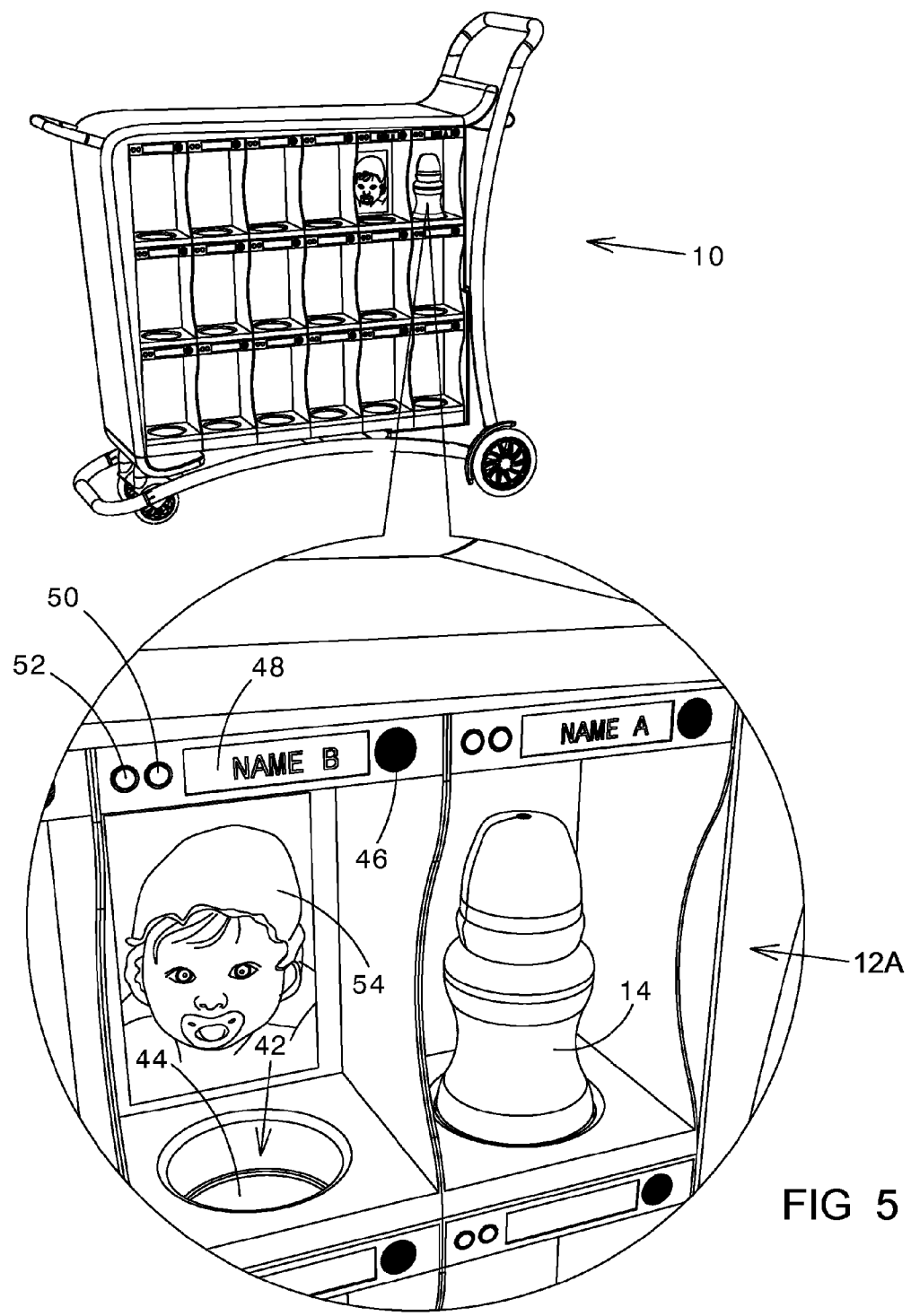
FIG. 5 depicts the elements of each compartment.

FIG. 5 depicts the elements of each compartment.

According to another embodiment, the association may be visual, for example each compartment has a photograph 54 of the child owning the cup. According to this embodiment even though drinking consumption inspection apparatus 10 does allow insertion of cup 12A into compartment 14B, the manager of drinking consumption inspection apparatus 10 is responsible for applying the association.

Each of compartments 12A and 12B includes a weight 44, for weighing the cup.

Figure 6:
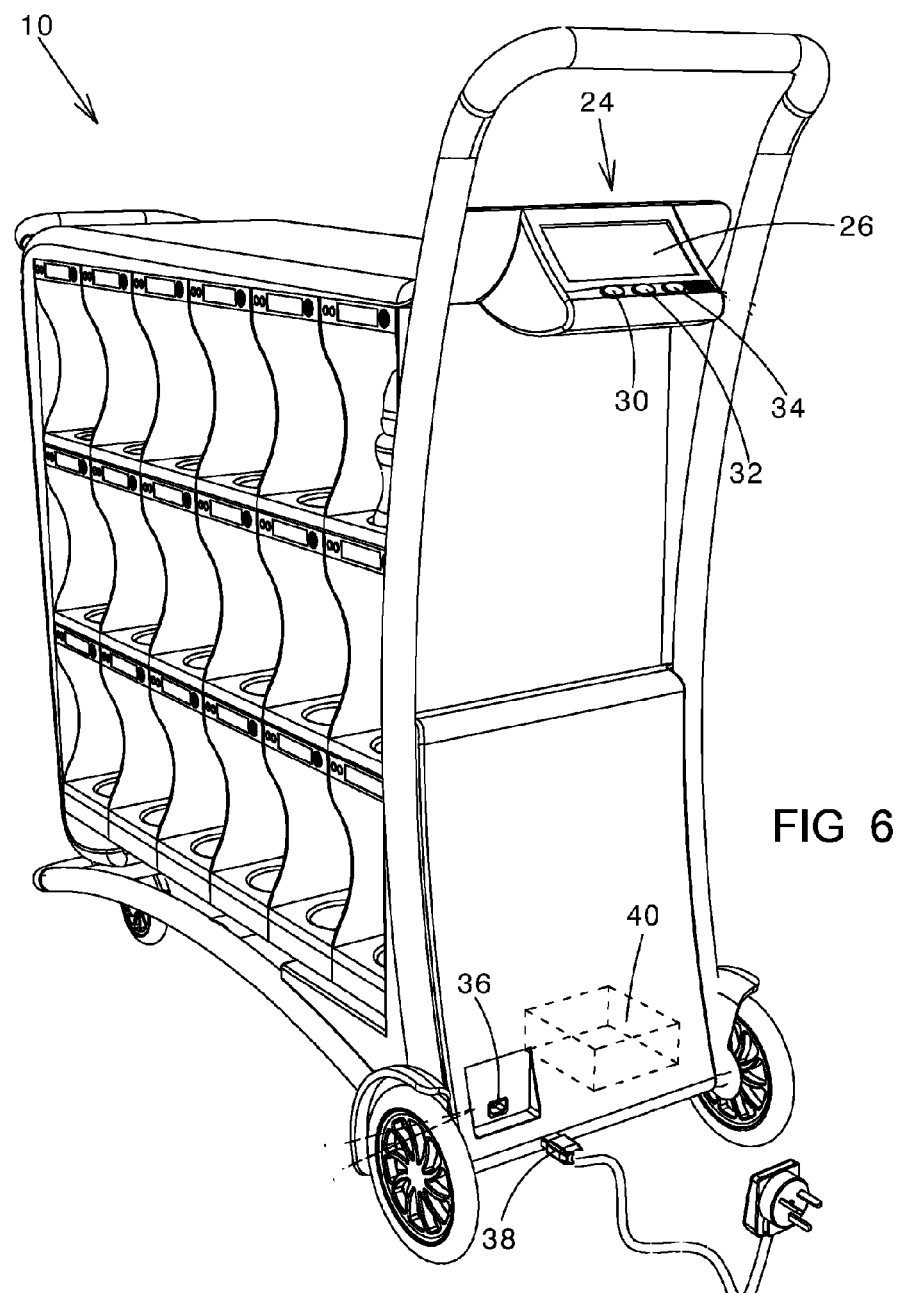
FIG. 6 depicts the central management of the drinking consumption inspection apparatus of FIG. 1.

FIG. 6 depicts the central management of the drinking consumption inspection apparatus of FIG. 1.

A controller 40 records each insertion, each drawing out of a cup, and the weight of the cup for each insertion, for tracking the filling into the cup and the drinking therefrom. Due to the association between the compartments and the cups, controller 40 can estimate whether the drinking of each bottle owner is reasonable.

Figure 7:
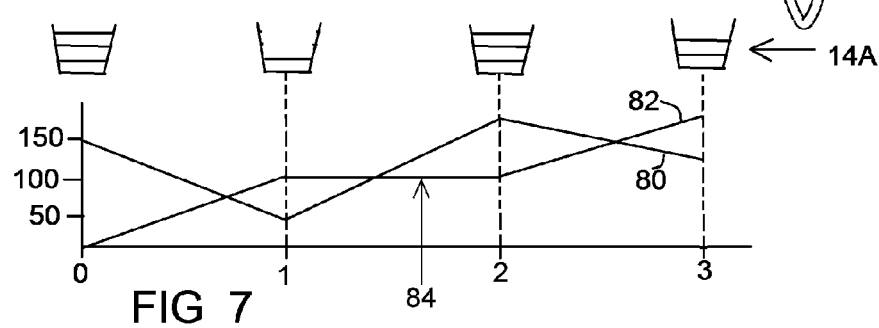
FIG. 7 depicts the calculation applied by controller 40.

FIG. 7 depicts the calculation applied by controller 40.

Since rise in the weight indicates filling of the cup, controller 40 accumulates decrease of the weight over time, since only the decease indicates drinking.

For example, suppose weight 44 weighs, as depicted by graph 80 the sequential weights of: 150 CC at hour 0; and an hour later, being hour 1, weighs 50 CC; and at hour 2 weighs 150 CC; and at hour 3 weighs 100 CC. Controller 40 accumulates the decreases of the weight only, and thus calculates, as depicted by graph 82, 150−50=100 CC at hour 1 and 2, and (150−50)+(150−100)=150 CC at hour 3.

Suppose the drinking rate is to be 60 CC per hour, then controller 40 should alert at point 84 (at hour 100/60=1.66) of graph 82 that the child of cup 14A is not sufficiently drinking.

The display of the amounts may be in any units of measurement, such as CC (cubic centimeters), liters, milliliters, Referring again to FIG. 1, for non-covered cups, each compartment may include a tap 76, for filling the cup upon insertion of the cup to the compartment.

The compartment may alert upon sensing that it is empty.

Figure 8:
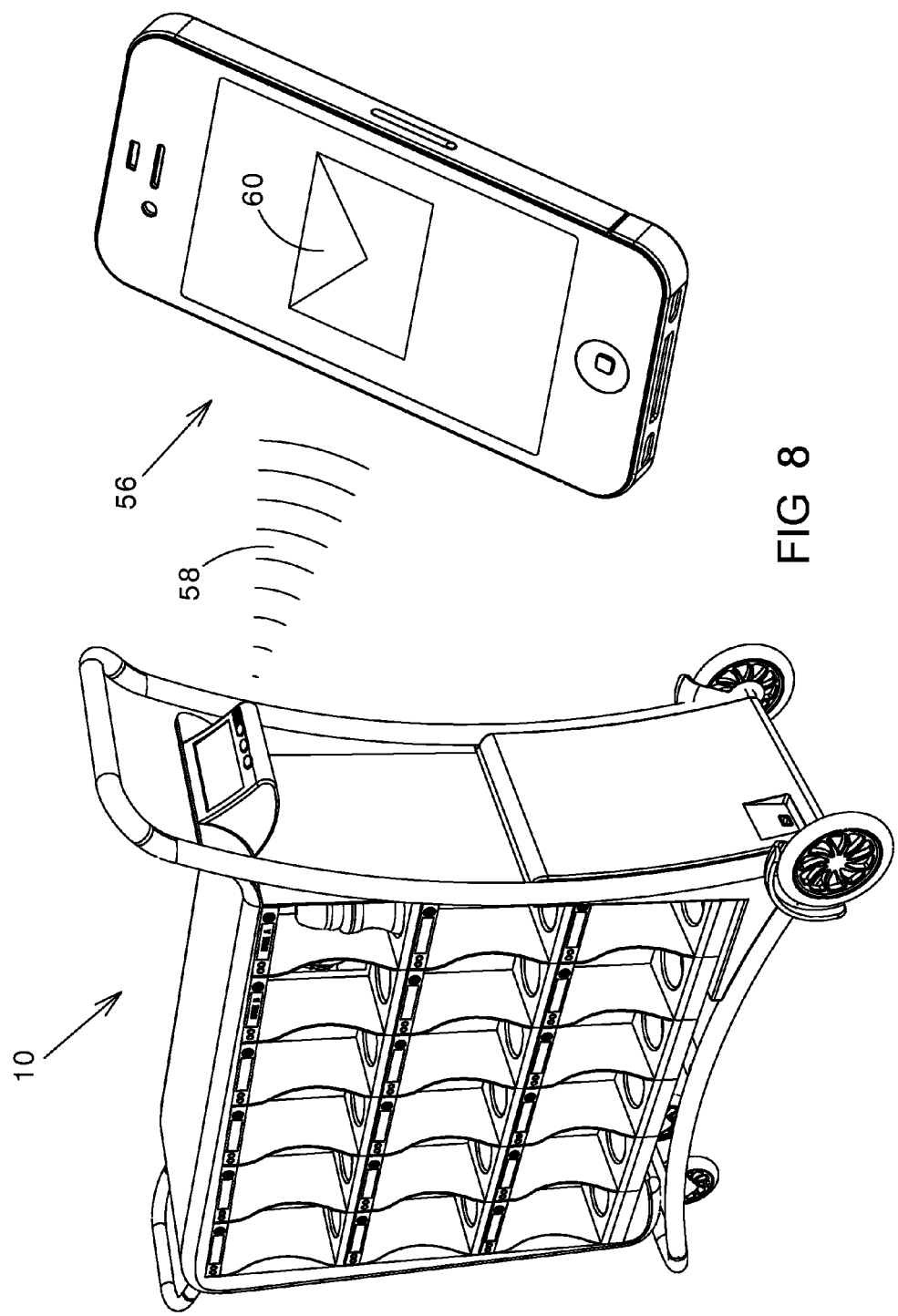
FIG. 8 depicts the central management of the drinking consumption inspection apparatus of FIG. 1 communicating outside.

FIG. 8 depicts the central management of the drinking consumption inspection apparatus of FIG. 1 communicating outside.

Alerts may be transmitted to a phone 56 of the manager.

Thus, in one aspect, the invention is directed to a drinking consumption inspection apparatus (10), including:
- a plurality of compartments (12A, 12B);
- a plurality of cups (14A, 14B), each being associated to a different and only to one person, and to a different and only one of the compartments (12A, 12B), for inserting the cup thereinto;
- a weight (44) for each of the compartments (12A, 12B), for weighing the cup (14A, 14B) thereof, upon the insertion; and
- a controller (40), for accumulating decrease of sequential weights provided by said weights (44), for each cup separately, over time, thereby the drinking consumption inspection apparatus (10) records drinking quantity of each of the cups (14A, 14B), for inspecting that each person drinks sufficiently.

The association of each of the cups (14A, 14B) to a different and only to one of the compartments (12A, 12B) may include insertability of each of the cups (14A, 14B) into a different and only to one of the compartments (12A, 12B).

The insertability of each of the cups (14A, 14B) into a different and only to one of the compartments (12A, 12B), may include a different fitting shape for each cup and compartment pair, for physically allowing the insertability of each of the cups (14A, 14B) into a different and only to one of the compartments (12A, 12B).

The insertability of each of the cups (14A, 14B) into a different and only to one of the compartments (12A, 12B), may include a different fitting electronic fitting, for alerting upon insertion of each of the cups (14A, 14B) into one of the compartments (12A, 12B), not being associated thereto.

The association of each of the cups (14A, 14B) to a different and only to one of the compartments (12A, 12B) may include visual association.

The plurality of compartments (12A, 12B) may constitute a cart.

The drinking consumption inspection apparatus (10) may further include:
- a tap (76), for each of the compartments (12A, 12B), for filling the cup thereof upon the insertion, thereby providing an incentive to insert the cup into the compartment thereof, for ensuring that the cup is weighed prior to the drinking.

The drinking consumption inspection apparatus (10) may further include:
- a heating element (74), for each of said compartments (12A, 12B), for maintaining the temperature of the beverage in the cup upon the insertion, thereby providing an incentive to insert the cup into the compartment thereof, for ensuring that the cup is weighed prior to the drinking.

The drinking consumption inspection apparatus (10) may further include:
- an alerting accessory (46), for alerting upon inspecting insufficient drinking.

In another aspect, the invention is directed to a drinking consumption inspection method, including the steps of:
- providing a plurality of compartments (12A, 12B);
- associating each of a plurality of cups (14A, 14B) to a different and only to one of the compartments (12A, 12B), for insertion thereinto;
- weighing, by a weight (44) of each of the compartments (12A, 12B), the cup (14A, 14B) thereof, upon the insertion; and
- accumulating decrease of the weight of each of the weights (44), for each cup separately, over time, thereby recording drinking quantity of each of the cups (14A, 14B) separately, for inspecting that each person drinks sufficiently.

The method may further include the step of:
- alerting upon inspecting (84) that at least one person drinks less than a pre-determined drinking rate.

In the figures and/or description herein, the following reference numerals (Reference Signs List) have been mentioned:
- numeral 10 denotes the drinking consumption inspection apparatus, according to one embodiment of the invention;
- numerals 12A and 12B denote compartments, each of a certain cup;
- numerals 14A and 14B denote cups, each associated to one compartment;
- numerals 16 and 18 denote handles of the cart;
- numerals 20 and 22 denote wheels of the cart;
- numeral 24 denotes a control panel;
- numeral 26 denotes a screen;
- numerals 30, 32 and 34 denote operating buttons;
- numeral 36 denotes a charging socket;
- numeral 38 denotes a charging cable;
- numeral 40 denotes a controller;
- numeral 42 denotes a niche, for inserting the cup;
- numeral 44 denotes a weight, for each cup;
- numeral 46 denotes a loudspeaker or any other alerting accessory, for alerting upon insufficient drinking;
- numeral 48 denotes the name of the cup owner;
- numeral 50 denotes a green led indicating satisfactory drinking;
- numeral 52 denotes a green led indicating non-satisfactory drinking;
- numeral 54 denotes a photograph or another indication that a certain compartment belongs to a certain child;
- numeral 56 denotes a phone of the manager;
- numeral 58 denotes a transmittance;
- numeral 60 denotes a message;
- numeral 62 denotes a central tank, for supplying beverage to taps of each compartment;
- numeral 64 denotes a cup unit, which may be a disposable or a non-disposable cup or baby bottle, for filling it with beverage for drinking therefrom;
- numeral 66 denotes a beverage pipe;
- numeral 70 denotes an accessory, which may accompany to associate a cup unit to a certain compartment; the accessory may constitute a base, which may even include electronic components; the accessory may include a sticker indicating the child;

numeral 72 denotes an electronic circuit, for associating a cup to a compartment;

numeral 74 denotes a heating element, being accompanied by a thermostat, for maintaining a pre-selected temperature of the beverage;

numeral 76 denotes a tap;

numerals 80 and 82 denotes graphs;

numeral 84 denotes a point at the graph indicating non sufficient drinking over time;

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

What is claimed is:

1. A drinking consumption inspection apparatus, comprising:
    a plurality of compartments;
    a plurality of cups, each being associated to a different and only to one person, and to a different and only one of the compartments, for inserting the cup thereinto;
    a weight sensor for each of said compartments, for weighing the cup thereof, upon said insertion;
    a tap, for each of said compartments, for filling the cup thereof upon the insertion, thereby providing an incentive to insert the cup into the compartment thereof, for ensuring that the cup is weighed prior to the drinking; and
    a controller, for accumulating decrease between sequential weights provided by said weight sensors, for each cup separately, over time, as indicating the drinking, while not accumulating increase between sequential weights, as indicating said filling,
    wherein said association of each of said cups to a different and only to one of said compartments comprises insertability of each of said cups into a different and only to one of said compartments, and
    wherein said insertability of each of said cups into a different and only to one of said compartments, comprises a member selected from a group consisting of:
    a) different fitting shape, for physically allowing said insertability of each of said cups into a different and only to one of said compartments,
    b) a different electronic code, for alerting upon insertion of each of said cups into one of said compartments, not being associated thereto,
    thereby said drinking consumption inspection apparatus records drinking quantity of each of said cups, for inspecting that each person drinks sufficiently.

2. A drinking consumption inspection apparatus according to claim 1, wherein said association of each of said cups to a different and only to one of said compartments comprises visual association.

3. A drinking consumption inspection apparatus according to claim 1, wherein said plurality of compartments comprise a cart.

4. A drinking consumption inspection apparatus according to claim 1, further comprising:
    a heating element, for each of said compartments, for maintaining a temperature of beverage in the cup upon the insertion,
    thereby providing an incentive to insert the cup into the compartment thereof, for ensuring that the cup is weighed prior to the drinking.

5. A drinking consumption inspection apparatus according to claim 1, further comprising:
    an alerting accessory, for alerting upon inspecting insufficient drinking.

\* \* \* \* \*